(12) United States Patent
Anand et al.

(10) Patent No.: US 7,472,377 B2
(45) Date of Patent: Dec. 30, 2008

(54) SYSTEMS AND METHODS FOR DETERMINING SOFTWARE PACKAGE IDENTITY DURING A SYSTEM BUILD

(75) Inventors: Ashok Anand, New Delhi (IN); Philippe G. Charles, Briarcliff Manor, NY (US); Amitkumar M. Paradkar, Mohegan Lake, NY (US); Donald P. Pazel, Montrose, NY (US); Beth R. Tibbitts, Lexington, KY (US); Pradeep Varma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 11/037,686

(22) Filed: Jan. 18, 2005

(65) Prior Publication Data

US 2006/0161892 A1 Jul. 20, 2006

(51) Int. Cl.
*G06F 9/44* (2006.01)
(52) U.S. Cl. ................... 717/121; 717/101
(58) Field of Classification Search ......... 717/106–107, 717/124, 140, 168–178, 101, 121
See application file for complete search history.

(56) References Cited

U.S. PATENT DOCUMENTS

| 7,222,341 | B2 * | 5/2007 | Forbes et al. | 717/170 |
|---|---|---|---|---|
| 2002/0144248 | A1 * | 10/2002 | Forbes et al. | 717/167 |
| 2004/0034850 | A1 * | 2/2004 | Burkhart et al. | 717/120 |
| 2005/0005261 | A1 * | 1/2005 | Severin | 717/120 |
| 2005/0132350 | A1 * | 6/2005 | Markley et al. | 717/168 |
| 2006/0031831 | A1 * | 2/2006 | Templin et al. | 717/120 |

* cited by examiner

*Primary Examiner*—Wei Y. Zhen
*Assistant Examiner*—Ryan D Coyer
(74) *Attorney, Agent, or Firm*—Ference & Associates LLC

(57) ABSTRACT

The provision of methods and apparatus to determine package identity for an application build. The idea is based on providing a mapping of package with affiliated attributes such as paths used for include or linking, along with reverse mappings. This mapping could be provided through any number of conventional environments such as program development environments or operating system registries: Tools would access this information through a programmatic interface, and use that information to identify packages affiliated with some information. For example, a symbol in a program would be defined in some file. That file would be in a path, which maps to the package identity. Thus, the symbol definition can be conceptually affiliated with a package.

15 Claims, 5 Drawing Sheets

SYSTEMS AND METHODS FOR DETERMINING SOFTWARE PACKAGE IDENTITY DURING A SYSTEM BUILD

FIELD OF THE INVENTION

The present invention relates generally to computer program development and in particular to arrangements for specifying ISV (Independent Software Vendor) or $3^{rd}$ party program artifacts that are to be used in the development of the program. As examples, these include specification of include paths, library paths, debug paths, etc.

BACKGROUND OF THE INVENTION

Programming languages and their development environments (compilers, linkers, debuggers, etc.) provide arrangements for code reuse, in particular code from ISVs or $3^{rd}$ party vendors. Typically, vendors provide source code header files, allowing the user to write programs to invoke the vendor's code and then to compile the code, and libraries used during linking, allowing execution access to the vendor's code. In many ways, this summary of exposed vendor materials is limited to the minimal amount of actual code exposure the consumer needs to use the vendor product, i.e. the full source code is not required. (Herein the term "package" is used in the sense described, yet is not limited to ISV or $3^{rd}$ party vendor code, but more generally to any well defined body of code used by a program in development or at runtime. There is also designated herein by the terms "package identity" or "package descriptor", any information about the package, above and beyond its installation, including, e.g., its name, version, product description, web link references, etc.) It turns out once these directories are specified through various access file paths, and even when the directory name is indicative of the $3^{rd}$ party's package by name, it is still unclear to the user, if an application actually uses a particular package from a given vendor. This may be due to duplicate file names in other directories picked up through higher precedence of paths (applying to both the compiler and linker). For example, there are several popular implementations of the C++ Standard Template Library (STL). However, it is a tedious manual analysis of different paths to figure out which STL was used on a file compilation or build.

Having clear identity of a utilized software package is important for a variety of reasons, among which are the following:

(1) Some implementations are more efficient than others & identifying the implementation actually used is critical to program performance.
(2) It is important to be consistent on packages used by the compiler and those by the linker.
(3) On package upgrading, the user application may need to be modified.
Knowing the locations in user application code where package APIs are used, will assist user to upgrade the application accordingly.

While in many cases naming conventions may out sort much of this, especially between different vendor packages, there are no guarantees. Also, naming conventions are likely to be similar when one upgrades a given vendor's package—so in this case, confusion regarding the package used by compiler and linker could easily occur.

Problematic here is not simply a case of the tools providing path information of the sets of paths they used. As mentioned, path names need not indicate the package's identity. Particularly, a need has been recognized in connection with providing a stronger identity of package than simply the sets of paths to access.

SUMMARY OF THE INVENTION

There is broadly contemplated, in accordance with at least one presently preferred embodiment of the present invention, the provision of methods and apparatus to determine package identity for an application build. The idea is based on providing a mapping of package with affiliated attributes such as paths used for include or linking, along with reverse mappings. This mapping could, be provided through any number of conventional environments such as program development environments or operating system registries. Tools would access this information through a programmatic interface, and use that information to identify packages affiliated with some information. For example, a symbol in a program would be defined in some file. That file would be in a path, which maps to the package identity. Thus, the symbol definition can be conceptually affiliated with a package.

In summary, one aspect of the invention provides a method of determining package identity for an application build in a program, the method comprising the steps of: determining, from a computing context, one or more location descriptors related to a program context; collecting identity descriptors associated with at least one of the location descriptors; and utilizing collected identity descriptors for further analytical purposes.

Another aspect of the invention provides an apparatus for determining package identity for an application build in a program, the apparatus comprising: an arrangement for determining, from a computing context, one or more location descriptors related to a program context; an arrangement for collecting identity descriptors associated with at least one of the location descriptors; and an arrangement for utilizing collected identity descriptors for further analytical purposes.

Furthermore, an additional aspect of the invention provides a program storage device readable by machine, tangibly embodying a program of instructions executable by the machine to perform method steps for determining package identity for an application build in a program, the method comprising the steps of: determining, from a computing context, one or more location descriptors related to a program context; collecting identity descriptors associated with at least one of the location descriptors; and utilizing collected identity descriptors for further analytical purposes.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Broadly contemplated herein are a method and apparatus for determining package dependency by one or more programming tools, either within or outside of a program development environment. In preferred embodiments, the programming tools are included within a programming environment, and include common program development tools, such as but not restricted to, compiler, linkers, library managers, debuggers, and program editors.

Figure 1:
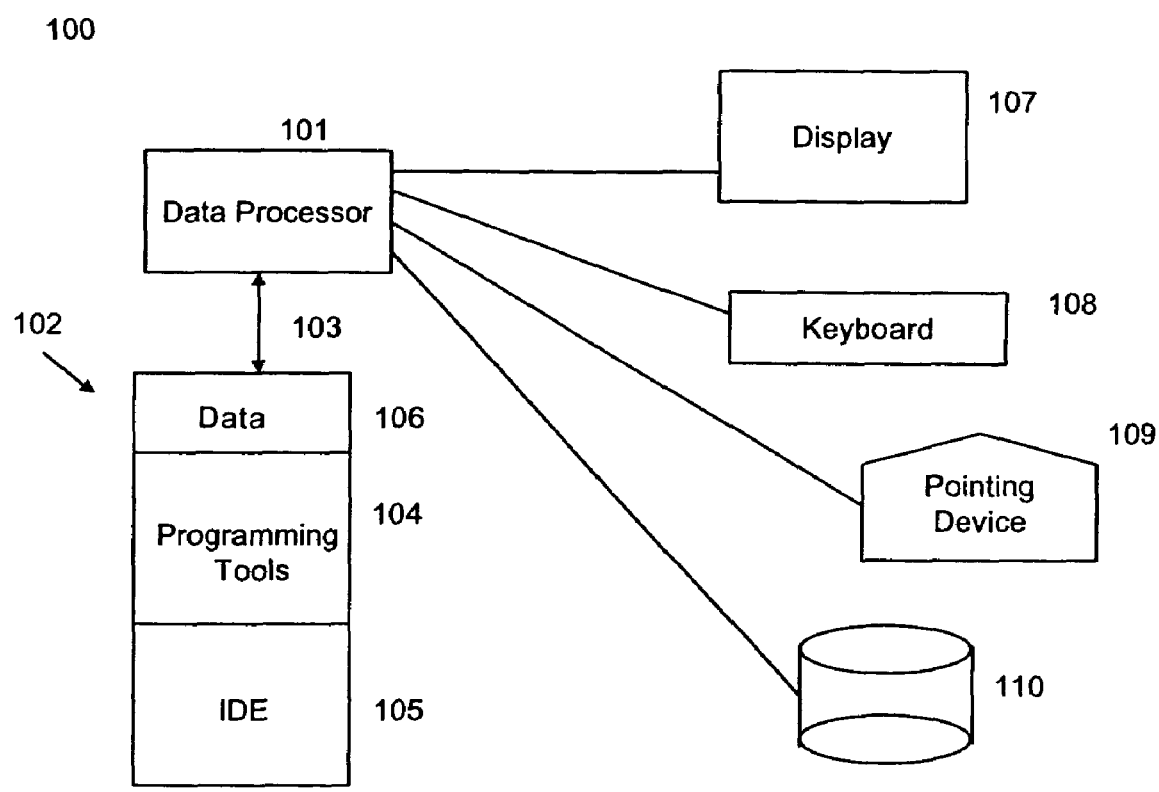
FIG. 1 depicts a block diagram of a data processing system.

Referring now to the drawings, and more particularly to FIG. 1, there is shown a block diagram of a data processing system 100 for program development of the present invention, as described above. In preferred embodiments, the data processing system 100 is an IBM Intellistation computer ("IBM" and "INTELLISTATION" are both registered trademarks of the International Business Machines Corporation). However, other data processing systems 100 are also contemplated for use by the present invention. For example, one can use a plurality of separate electronic circuits or devices (e.g., hardwired electronic or logic circuits, or programmable logic devices such as PLDs, PLAs, PALs, or the like). A suitable programmed general purpose computer, e.g., a microprocessor, microcontroller or other processor device (CPU or MPU), either alone or in conjunction with one or more peripherals (e.g. integrated circuit) data and signal processing devices can be used. In general, any device or assembly of devices on which a finite state machine capable of implementing the flow charts shown in the figures can be used as a controller in accordance with the embodiments of the present invention.

Referring again to FIG. 1, the data processing system 100 may preferably comprise a data processor 101 having a memory 102. The memory 102 is coupled to the data processor 101 via a bidirectional bus 103. In preferred embodiments, the memory 102 includes program and data memory. The memory also includes program development tools 104, compilers, linkers, and library managers. It may also contain an integrated program development environment IDE 105, which can invoke the program development tools 104. The memory 102 also contains data memory 106, specifically data and objects related to the execution of the program development tools 104 and the IDE 105.

The IDE 105 presents information to the user on display 107, which is coupled to the data processor 101. In at least one preferred embodiment, a user data entry device 108 (e.g. keyboard or other interactive device), and a pointing device 109, for example, a mouse or a trackball, are also coupled to the data processor 101.

In a preferred embodiment, the display 107 provides a presentation space for the IDE in order to display the pieces of a program being constructed. In further embodiments, either the pointing device 108 or predefined keys of the data entry device 109 may be used to manipulate the data in conformity with aspects of the present invention.

It is also contemplated that a persistent storage mechanism 110 may preferably exist and be utilized to store IDE and program piece information 106. This type of storage media may include, but is not limited to, standard disk drive technology, tape, or flash memory. In a preferred embodiment, the program information 106 may be both stored onto the persistent media, and/or retrieved by similar processing system 100 for execution.

Figure 2:
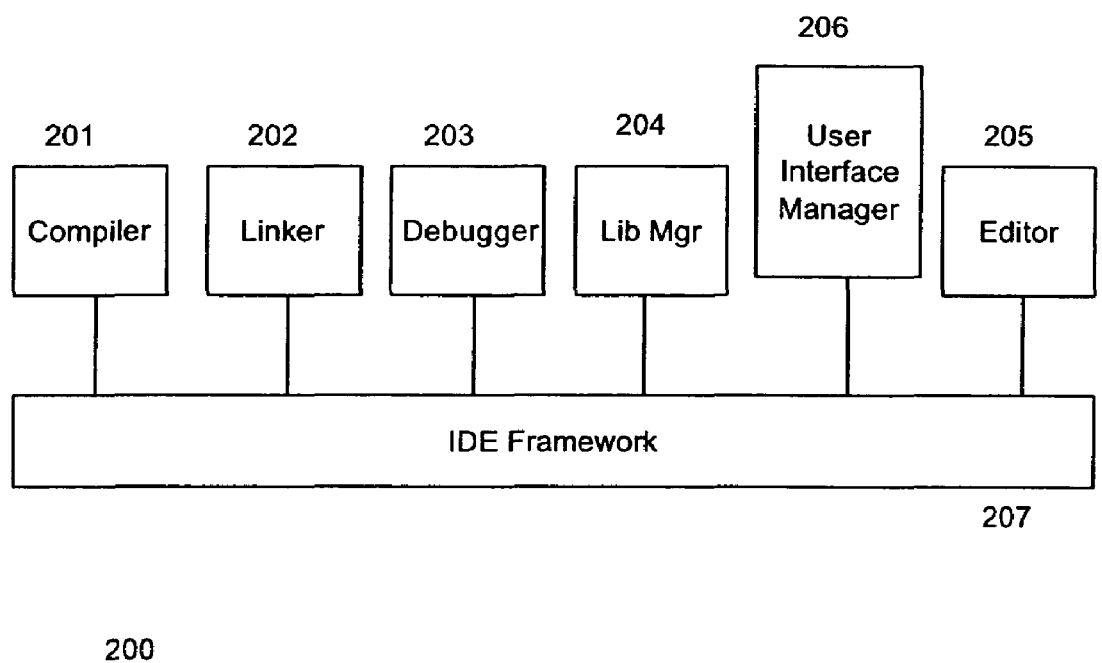
FIG. 2 depicts a block diagram of a program development environment, relating different components of said environment, and including programming tools executed by the environment.

In FIG. 2 there is shown an overview 200 of the components of an interactive program development program, in accordance with a preferred embodiment. The environment shows a set of commonly recognized program development tools, such as but not limited to, a compiler 201, a linker 202, a debugger 203, and a program library manager 204. There is also shown a program editor 205, typically used as a processor for source code entry, but not restricted to that purpose. There is also a user interface manager 206 which coordinates different views on program artifacts such as source views, project views, and the like. There is also an IDE framework component 207 which is a process which integrates the entire above mentioned components, coordinating their executions and collecting their outputs. The IDE framework provides other functions such as program project management, file management, and sequences user activity.

Figure 3:
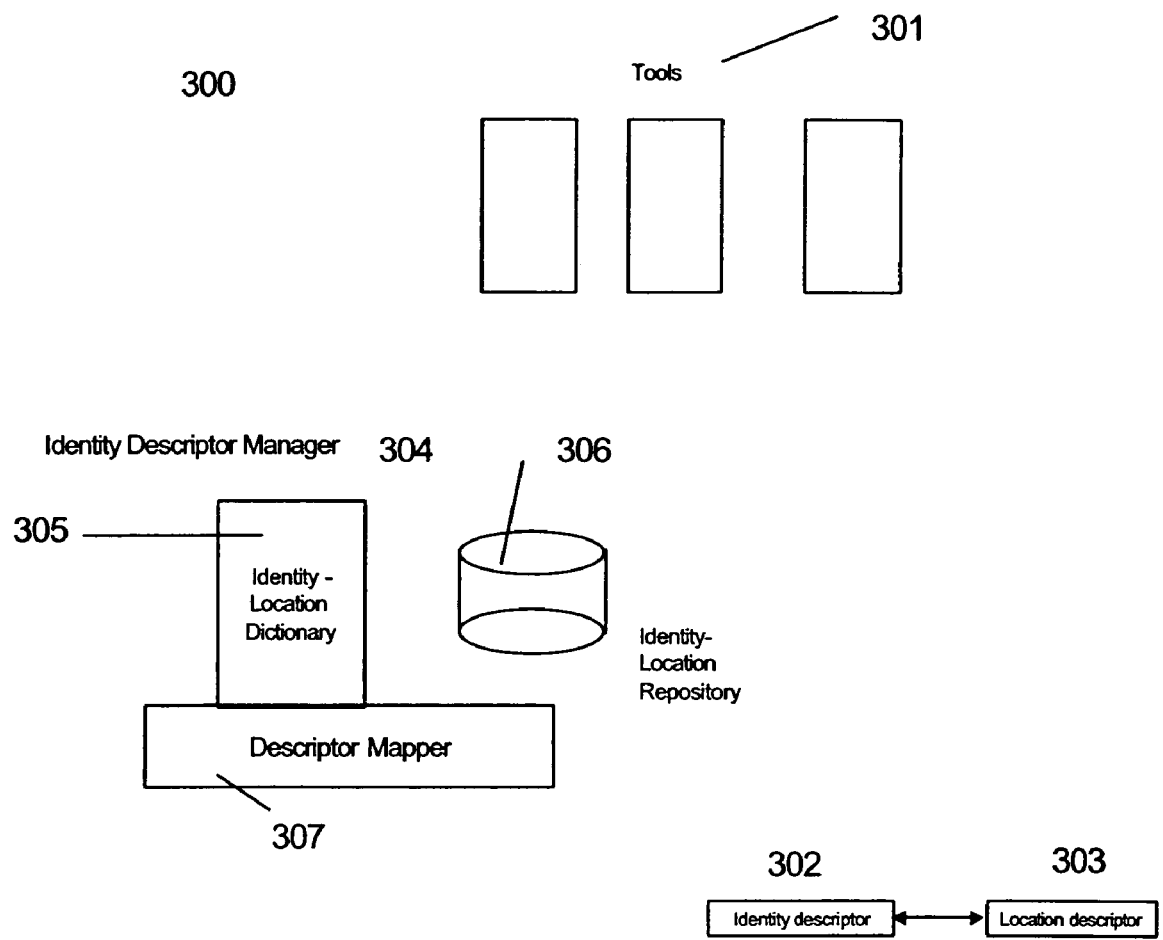
FIG. 3 depicts a block diagram showing tool component architecture, and additionally a descriptor manager and plug-in components.

In FIG. 3 there is shown an overview 300 of the software components and related data of a typical tool found in an interactive program development program 200, as it relates to a preferred embodiment. Preferably provided is a set of program development tools 301. By way of example only, such tools include compilers, linkers, program analyzers, etc.

By the term location descriptor what is generally meant is a data reference, including but not restricted to file or directory paths, URLs, data base references, or any other arrangement for locating data or a repository of data. By identity descriptor what is generally meant is any information about a software entity, above and beyond related location descriptors, including by way of example, its name, version, product description, web link references, etc. There is shown in FIG. 3 the data schema for an identity-location descriptor mapping. An identity descriptor 302 has a set of location descriptions 303. This is a simple mapping, as is typically implemented as program hash maps, familiar to those of ordinary skill in the art. Reversing this defined mapping, each location descriptor 303 has one or more identity descriptors 302. Again, those of ordinary skill in the art will recognize that these mappings are easily implemented.

There is preferably provided, in accordance with at least one presently preferred embodiment of the present invention, a software component called the identity descriptor manager 304, whose function is to retrieve the identity descriptors that map from a given location descriptor, or visa versa, or to retrieve the location descriptors that map from a given identity descriptor. The identity-location dictionary 305 includes the data that provides the mappings between identity and location descriptors. The information need not necessarily be restricted to computer memory and, in fact, could embrace other storage arrangements including, for example disk, flash memory, or any distributed memory means. In that sense, and by way of illustrative example only, there could be a persistent repository 306 of the identity-location dictionary. There is also preferably a descriptor mapper 307 whose purpose is to process requests from client processes. This component processes requests, of which the following are but a few illustrative and non-restrictive examples:

addition of new identity-location mappings;
    removal of identity-location mappings
    provision of a set of all locations that map to an identity; and
    provision of a set of all identities that map to a location.

Figure 4:
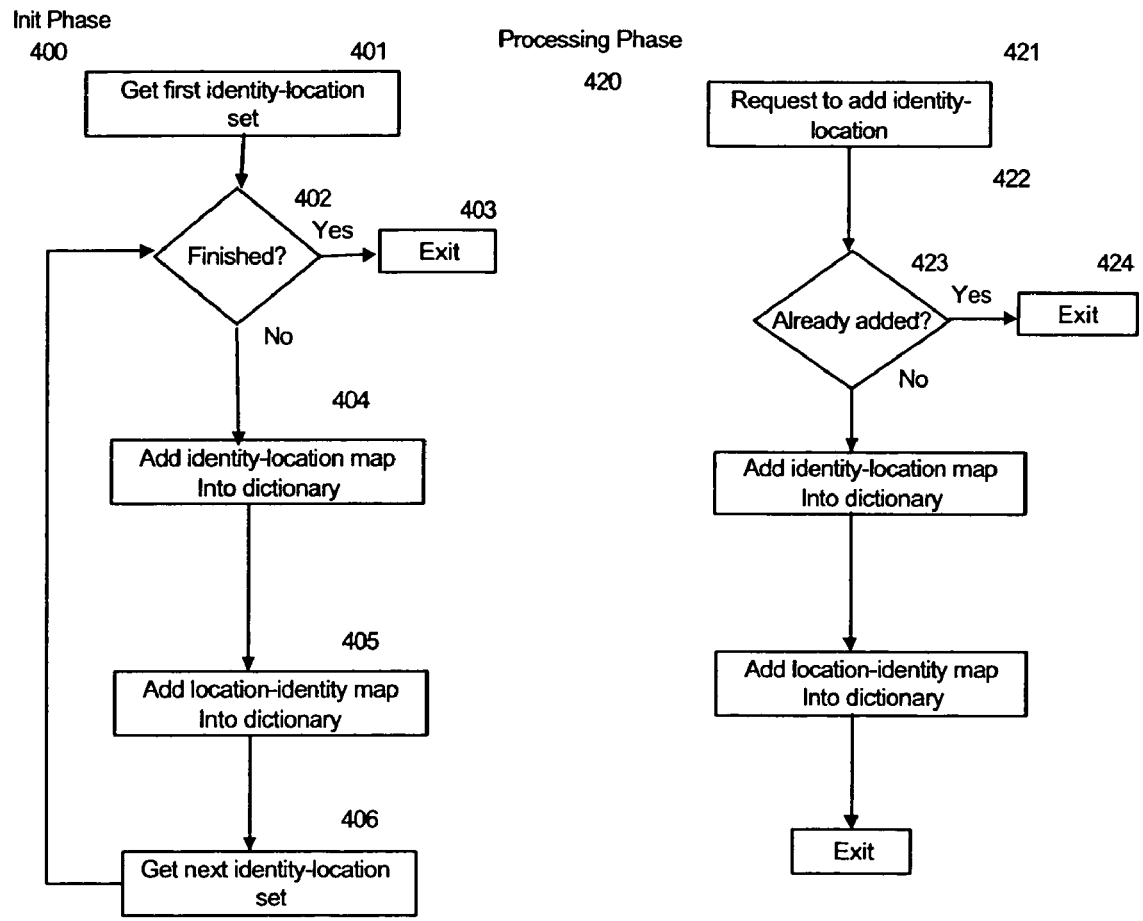
FIG. 4 depicts a block diagram showing the logic for populating the descriptor-location dictionary.

FIG. 4 outlines the logic for populating the identity-location dictionary. This occurs in two phases, namely at the initialization phase for a tool's use which presumably happens when the tool is initialized, and during tool processing as symbols are generated. In the initialization phase 400, the first identity-location set is acquired 401. If one is finished 402 getting identity-location-sets, we simply exit 403 the process. Otherwise, the identity-location mapping is added to the dictionary 404, as well as the location-identity mapping 405 based on the current identity-location set. This is done in a manner consistent with the data schema for entries in the dictionary described in FIG. 3. The next symbol-location set is obtained 406; with a return to the query 402 on the last detected such set.

Returning to FIG. 4, the logic for populating the identity-location dictionary during processing phase 420 begins with a request by the tool to add a given identity-location set to the dictionary 421. The identity descriptor manager determines if a given identity and all the related locations are in the dictionary 422. If yes, the identity descriptor manager returns to the caller. In this state, the identity-location mappings must be either created or updated, techniques for which are based on the mapping scheme such as hash tables, and are easily understood by anyone skilled in the art of programming. The identity-location information is added or updated 424, as well as the location-identity mapping 425. This is done in a manner consistent with the data schema for entries in the dictionary described in FIG. 3. Returning to FIG. 4, the identity-location manager returns control to the caller 426.

Figure 5:
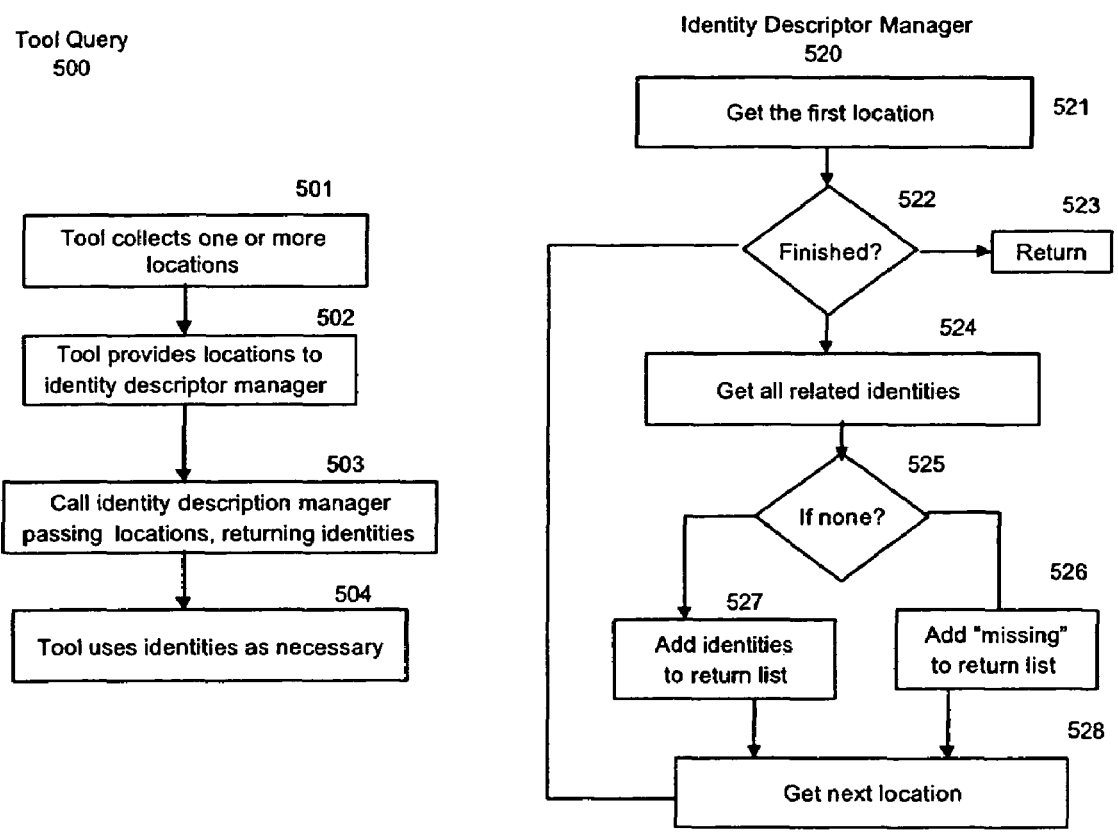
FIG. 5 depicts a block diagram showing the logic for a tool's query.

In FIG. 5 there is shown logic for a tool's query, by way of the identity-location manager, for finding the identity descriptors related to one or more location descriptors. The tool collects a set of one or more locations 501, and passes these to the identity-location manager 502. The identity-location manager finds all mapped identity descriptors 503, a process which will be more fully described at 520. The tool then uses the descriptors in a means commensurate to the semantic processing of the tool 504.

Returning again to FIG. 5, there is shown 502, the logic processes of the identity-descriptor manager for determining, for a set of location descriptors, the set of mapped identity descriptors. The process commences with acquiring the first location descriptor 521. A check is made to see if this is the last location descriptor of the input set of location descriptors 522. If so, the tool exits with the current set of mapped identity descriptors 523. Otherwise, using the mapping means for identity-locations, the identity descriptor manager get the set of mapped identity descriptors 524. A check is made to see if the set is empty 525. If there are none, a note that there are no identity descriptors for that location descriptor is added to the return list 526. Otherwise, the identity descriptors are added to the return list 527. Whether redundancies are accepted or not into the return list is an implementation decision. The next location is obtained 528 with a return to the query on whether the list of input locations is exhausted 522.

As discourse on the utility of the embodiments of the present invention, consider languages such as C++ or Java. Location descriptors, as used to include sub-packages (or files) into a given file, can be collected by a lexical search for the pertinent programming language key words such as #include statements in the file. From such a search, the list of location descriptors can be collected. Using user-supplied or environment-obtained path information, the location descriptor information can be completed by straightforward means. Next, by attempting to map individual (completed) location descriptors in such a list to their identity descriptors, the completeness of the dictionary knowledge for the location descriptors contained in a given file can be determined. If knowledge is complete, the individual mappings can be collected into a list of identity descriptors corresponding to the location descriptors contained in the file. Such knowledge has useful purpose in identifying potentially erroneous conditions such as an unintentional reference to files from two distinct package implementations (e.g. C++ STL implementations), when only one should be used.

Again as discourse on utility, another purpose that such information can serve is to recursively traverse the files of a package and its included files, collecting the known package identity descriptors in the process and their include dependencies on each other. Recursive traversal of files is dependent upon the existence of included files as per specified location descriptors, which cannot be assumed since a combination of conditional compilation programs may be precluding individual include statements from actual use and hence the include files may not have been supplied or been otherwise removed. Regardless, a traversal over as much of the included files' structure as it exists can be carried out and identity information over the existing tree obtained. Such information is useful in indicating when a software package upgrade requires upgrading the files which depend upon or include the given package.

Similar logic for querying and obtaining a list of locations given a set of identities is similar to the above, and easily produced.

It is to be understood that the present invention, in accordance with at least one presently preferred embodiment, includes an arrangement for determining one or more location descriptors related to a program context, an arrangement for collecting identity descriptors associated with at least one of the location descriptors, and an arrangement for utilizing collected identity descriptors for further analytical purposes. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer implemented method of determining package identity for an application build in a program, said method comprising the steps of:

determining, from a computing context, one or more location descriptors related to a program context, wherein said location descriptors comprise URL data references;

collecting identity descriptors associated with at least one of the location descriptors, wherein said identity descriptors comprise web link references, and said collecting step further comprises collecting location descriptors contained in a given file for a given include path context;

mapping said location descriptors and said identity descriptors as program hash maps for use in an identity descriptor manager, wherein said program hash maps are stored as an identity-location dictionary embedded in flash memory;

employing the identity descriptor manager to retrieve said identity descriptors that map from said location descriptor and/or said location descriptors that map from said identity descriptor; and utilizing collected identity descriptors for further analytical purposes for determining package identity of an application build in a program, wherein said utilizing step comprises;

verifying the completeness of collected identity descriptors and, if complete, providing the collected identity descriptors depended upon by the given file; and utilizing collected identity descriptors for the further analytical purpose of identifying potentially erroneous conditions, wherien said potentially erroneous condition comprises an unintentional reference to files from two distinct package implementations when only one should be used.

2. The method according to claim 1, wherein said utilizing step comprises utilizing collected identity descriptors for at least one of the following further analytical purposes: optimization and program understanding.

3. The method according to claim 1, wherein the collected descriptors relate to import file information regarding vendor packages.

4. The method according to claim 3, wherein said utilizing step comprises presenting use of a vendor package as an error condition related to software porting.

5. The method according to claim 1, wherein:

said collecting step comprises collecting the known sub-package dependencies of a given package via recursively traversing files of the package via location descriptors contained in the files of the files of the package; and said utilizing step comprises utilizing the collected package dependencies for further identification purposes.

6. The method according to claim 5, wherein said step of utilizing the collected package dependencies for further identification purposes comprises identifying dependent packages to be a affected by a given software package upgrade.

7. The method according to claim 1, wherein said utilizing step comprises checking the collected identity descriptors to verify that no two location descriptors refer to distinct packages or package implementations having similar functionality.

8. An apparatus for determining package identity for an application build in a program, said apparatus comprising:

a processor;

an arrangement for determining, from a computing context, one or more location descriptors related to a program context, wherein said location descriptors comprise URL data references;

an arrangement for collecting identity descriptors associated with at least one of the location descriptor, wherein said identity descriptors comprise web link references, and said collecting step further comprises collecting location descriptors contained in a given file for a given include path context;

an arrangement for mapping said location descriptors and said identity descriptors as program hash maps for use in an identity descriptor manager, wherein said program hash maps are stored as stored as an identity-location dictionary embedded in flash memory;

an arrangement for employing the identity descriptor and manager to retrieve said identity descriptors that map from said location descriptor and/or said location descriptors that map from said identity descriptor; and an arrangement for utilizing collected identity descriptors for further analytical purposes for determining package identity of an application build in a program, wherein said arrangement for utilizing comprises;

verifying the completeness of collected identity descriptors and, if complete, providing the collected identity descriptors depended upon by the given file; and utilizing collected identity descriptors for the further analytical purpose of identifying potentially erroneous conditions, wherein said potentially erroneous condition comprises an unintentional reference to files from two distinct package implementations when only one should be used.

9. The apparatus according to claim 8, wherein said utilizing arrangement is adapted to utilize collected identity descriptors for at least one of the following further analytical purposes: optimization and program understanding.

10. The apparatus according to claim 8, wherein the collected descriptors relate to import file information regarding vendor packages.

11. The apparatus according to claim 10, wherein said utilizing arrangement is adapted to present use of a vendor package as an error condition related to software porting.

12. The apparatus according to claim 8, wherein.

said collecting arrangement is adapted to collect the known sub-package dependencies of a given package via recursively traversing tiles of the package via location descriptors contained in the of the package; and said utilizing arrangement is adapted to utilize the collected package dependencies for further identification purposes.

13. The apparatus according to claim 12, wherein said utilizing arrangement is adapted to identify dependent packages to be affected by a given software package upgrade.

14. The apparatus according to claim 8, wherein said utilizing arangement is adapted to check the collected identity descriptors to verify that no two location descriptors refer to distinct packages or package implementations having similar functionality.

15. A program storage device readable by machine, tangibly embodying a program of instructions executable by the machine to perform computer implemented method steps for determining package identity for an application build in a program, said method comprising the steps of:

determining, from a computing context, one or more location descriptors related to a program context, wherein said location descriptor comprise URL data. references;

collecting identity descriptors associated with at least one of the location descriptors, wherein said identity descriptors comprise web link references, and said collecting step further comprises collecting location descriptors contained in a given file for a given include path context;

mapping said location descriptors and said identity descriptors as program hash maps for use in an identity descriptor manager, wherein said program hash maps are stored as an identity-location dictionary embedded in flash memory;

employing the identity descriptor manager to retrieve said identity descriptors that map from said location descriptor and/or said location descriptors that map from said identity descriptor; and utilizing collected identity descriptors for further analytical purpose for determining package identity of an application build in a program, wherein said utilizing step comprises;

verifying the completeness of collected identity descriptors and, if complete, providing the collected identity descriptors depended upon by the given file; and utilizing, collected identity descriptors for the further analytical purpose of identifying potentially erroneous conditions, wherein said potentially erroneous condition comprises an unintentional reference to files from two distinct package implementations when only one should be used.

* * * * *